(12) United States Patent
Anderson et al.

(10) Patent No.: US 9,032,291 B2
(45) Date of Patent: May 12, 2015

(54) USING SKETCH EFFECTS AS PART OF DISPLAYING ONE OR MORE ELECTRONIC DOCUMENT OBJECTS

(75) Inventors: Paul Nathan Anderson, Seattle, WA (US); Jie Li, Bellevue, WA (US); Cathy Lynn McBride, Seattle, WA (US); Jimmy Y. Sun, Sammamish, WA (US); Eduardo Ramon Lemus Velazquez, Tlalnepantla (MX); Zijia Zheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 13/269,959

(22) Filed: Oct. 10, 2011

(65) Prior Publication Data

US 2013/0091427 A1    Apr. 11, 2013

(51) Int. Cl.
G06F 17/00    (2006.01)
G06F 17/24    (2006.01)
G06F 17/21    (2006.01)

(52) U.S. Cl.
CPC ..................... *G06F 17/211* (2013.01)

(58) Field of Classification Search
CPC .................... G06F 17/248; G06F 2203/04804; G06T 11/60; G06T 2207/20132; G06T 2219/2004; G06T 2219/2021

USPC ................................................... 715/211, 267
See application file for complete search history.

(56) References Cited

U.S. PATENT DOCUMENTS

| | | | |
|---|---|---|---|
| 6,941,276 B2 * | 9/2005 | Haeberli | 705/26.5 |
| 7,036,077 B2 | 4/2006 | Saund | |
| 7,039,216 B2 | 5/2006 | Shum | |
| 7,190,374 B2 | 3/2007 | Lake | |
| 7,639,250 B2 | 12/2009 | Xu | |
| 7,724,287 B2 | 5/2010 | Cazier | |
| 2004/0056871 A1 * | 3/2004 | Milliron | 345/647 |
| 2008/0301546 A1 * | 12/2008 | Moore et al. | 715/243 |
| 2009/0303199 A1 | 12/2009 | Cho | |
| 2010/0138028 A1 * | 6/2010 | Tasker et al. | 345/634 |
| 2012/0092340 A1 * | 4/2012 | Sarnoff et al. | 715/702 |
| 2013/0127889 A1 * | 5/2013 | Winnemoeller et al. | 345/582 |
| 2013/0162681 A1 * | 6/2013 | Peterson | 345/647 |

* cited by examiner

*Primary Examiner* — Kavita Padmanabhan
*Assistant Examiner* — Ariel Mercado
(74) *Attorney, Agent, or Firm* — Steven Crocker; Jim Ross; Micky Minhas (57) ABSTRACT

Systems and methods for distorting the form or format of an object in an electronic document. A sketch effect theme defines parameters that when applied to the object modify one or more coloring, formatting, and effects characteristics of the object to convey a sketched or hand-drawn look or feel to the object. The parameters are stored in a record associated with the document to persist the sketch effect theme through different sessions in which the document is active or open.

19 Claims, 8 Drawing Sheets

USING SKETCH EFFECTS AS PART OF DISPLAYING ONE OR MORE ELECTRONIC DOCUMENT OBJECTS

BACKGROUND

Sketching applications enable the creation of diagrams that represent dataflows, workflows, system architectures, and other visual information. The building blocks of such diagrams may include, among other components, shapes connected by lines, arrows, and/or other visual aids. When a particular diagram is complete, the building blocks are typically rendered in an idealized form such that the diagram is suitable for presentation and/or viewing. However, rendering a diagram in idealized form may not be desirable during, for example, creation stages of the same.

SUMMARY

In one aspect, a computer-implemented method for distorting at least one feature of an object within a document is disclosed. The method includes: receiving, at an application executing on a computing device, a request to apply a theme comprising a set of characteristics that are applied to the object within the document; generating a random number in response to receiving the request to apply the theme; generating a plurality of parameters based on the random number, wherein the plurality of parameters at least partially distort the at least one feature of the object to create a modified object; and at least temporarily rendering the modified object in the application on a display of the computing device.

In another aspect, a method for applying an effect to an object within an electronic document is disclosed. The method includes: applying a first theme comprising a first set of characteristics to the object within the electronic document in response to receiving, at an application executing on a computing device, a request to apply the first theme; generating a random number in response to receiving the request to apply the first theme; generating a plurality of parameters based on the random number, wherein the plurality of parameters at least partially distort at least one feature of the object to produce a modified object; storing the random number and the plurality of parameters in a record associated with the electronic document, the record configured to at least receive and manipulate alphanumeric text, numeric values, and formulas; and rendering the modified object in the application on a display of the computing device.

In yet another aspect, a computer-readable storage medium having computer-executable instructions is disclosed that, when executed by a computing device, cause the computing device to perform steps including: receiving, at a diagramming application executing on the computing device, a request to preview a theme comprising a set of characteristics to be applied to a geometric shape within a document, wherein the set of characteristics are selected from the group comprising: text characteristics; line characteristics; connector characteristics; fill characteristics; shadow characteristics; accent characteristics; and background characteristics; generating a randomized integer value in response to receiving the request to preview the theme; generating a plurality of parameters based on the randomized integer value, wherein the plurality of parameters at least partially distort the at least one feature of the object to generate a modified object that includes at least one of: a curved line; a line having a varying thickness along a length of the line; a fill that incompletely occupies an internal area defined by a plurality of sides of the object; a fill that overlaps at least one side of a plurality of sides of the object; and a discontinuity along a length of a line; storing the randomized integer value and the plurality of parameters in a record associated with the document, the record comprising a plurality of cells at least configured to receive and manipulate alphanumeric text, numeric values, and formulas; closing the document in response to receiving a request to exit the document; retrieving the random number and the plurality of parameters from the record in response to receiving a request to open the document; and at least temporarily rendering the modified object in the diagramming application on a display of the computing device.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DETAILED DESCRIPTION

The present disclosure is directed to systems and methods for at least partially distorting the form or format of one or more objects in an electronic document. In example embodiments, this is accomplished by lending a particular object a "less polished" appearance, as if the object had been drawn by hand. Such an implementation conveys a sense of incompleteness that can inform a user that the document is in draft form, or to simply add an interesting visual effect. By altering various factors influencing a level of distortion, as well as controlling what formatting and colors are displayed, a plurality of "sketch effects" can be created to provide the user with a multitude of design options, in addition to regular theming. Although not so limited, an appreciation of the various aspects of the disclosure will be gained through a discussion of the examples provided below.

Figure 1:
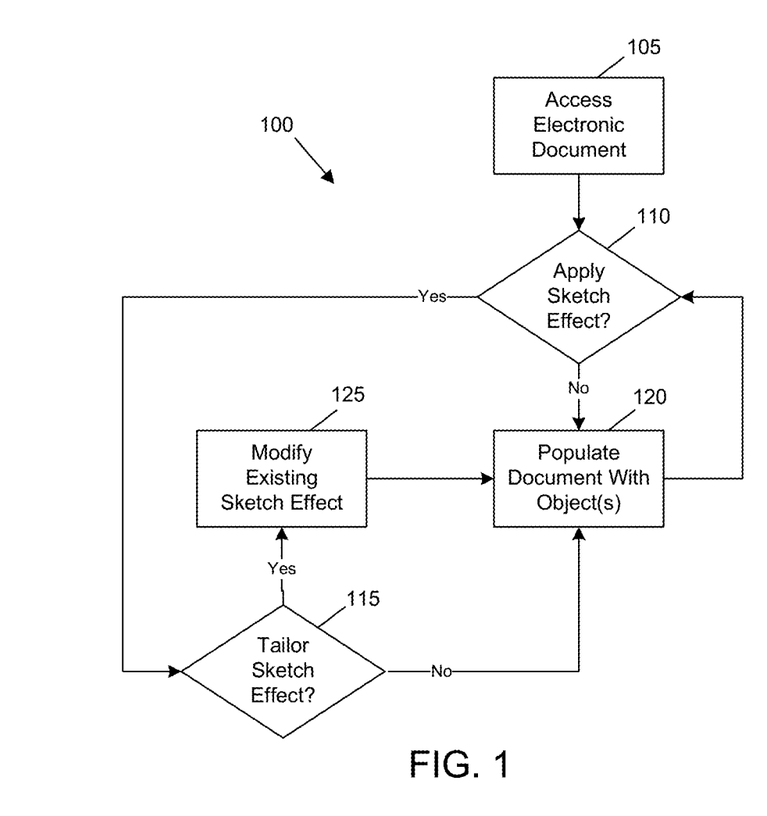
FIG. 1 shows a flowchart of an example method for selectively applying a sketch effect to one or more objects within an electronic document.

Referring now to FIG. 1, an example method 100 for selectively applying a sketch effect to one or more objects within an electronic document is shown. Example objects include shapes, pictures, clip art, charts, equations, and/or any other perceivable element or item contained within or associated with an electronic document. In one embodiment, the method 100 is at least partially implemented on and/or by a client computing device, such as described below in connection with FIGS. 2-4. Other embodiments are possible.

The method 100 begins at a first input operation 105 at which a user interacts with a software application executing on a computing device to access or create an electronic document. In one embodiment, the application is a diagramming program used to produce diagrams that represent dataflows, workflows, system architectures, or any other type of visual information device. Microsoft VISIO® diagramming software from Microsoft Corporation of Redmond, Wash. is one example of such a program. Other embodiments are possible. For example, the software application can generally be any type of single or multiple-functionality program, such as a word processing program, a spreadsheet program, a presentation program, and others.

Next, at a first decision operation 110, the user selectively determines whether to apply a "sketch effect" to one or more existing objects within the document, or, in event that the document is newly created, to one or more objects to be added thereto. In one embodiment, a sketch effect is a theme-like feature whose colors, formatting, and effects are designed to apply a sketched or hand-drawn look or feel to any particular object within a document. In general, a sketch effect can be a pre-existing theme, or built-in theme, that is created by an OEM and shipped with the application. A sketch effect can also be created as a customized theme by an end user or third party developer as desired. Other embodiments are possible.

Operational flow branches to a second decision operation 115 upon an affirmative decision at the first decision operation 110. Otherwise, operational flow branches to a second input operation 120. The second input operation 120 is discussed in further detail below.

At the second decision operation 115, the user selectively determines whether to customize a built-in sketch effect theme. In one embodiment, customization of a sketch effect theme may be performed by first applying a built-in sketch effect theme that is similar to a desired customized theme, and then modifying or adjusting various color, formatting, and effect parameters of the built-in sketch effect theme to achieve desired results. Other embodiments are possible.

Upon an affirmative decision at the second decision operation 115, operational flow branches to a third input operation 125 at which the user interacts with the application to customize a sketch effect theme in a manner as described above at the second decision operation 115. Otherwise, operational flow branches to the second input operation 120. Operational flow also branches to the second input operation 120 following customization of a sketch effect theme at the third input operation 125.

At the second input operation 120, the user interacts with the application to selectively insert one or more objects into the document. In one embodiment, the user creates a flowchart within the document at the second input operation 120 that represents a particular algorithm or process. In this example, the flowchart may include one or more processing steps and/or decision steps connected by arrows or lines as desired. Other embodiments are possible.

Following insertion of the one or more objects at the second input operation 120, operational flow returns to the first decision operation 110, at which the user selectively determines whether to apply a "sketch effect" to one or more of the existing objects within the document. In this manner, the example method 100 enables the user to apply and optionally modify a sketch effect theme prior to populating the document with an object(s), and/or apply and optionally modify a sketch effect theme after insertion of at least one object within the same.

Figure 2:
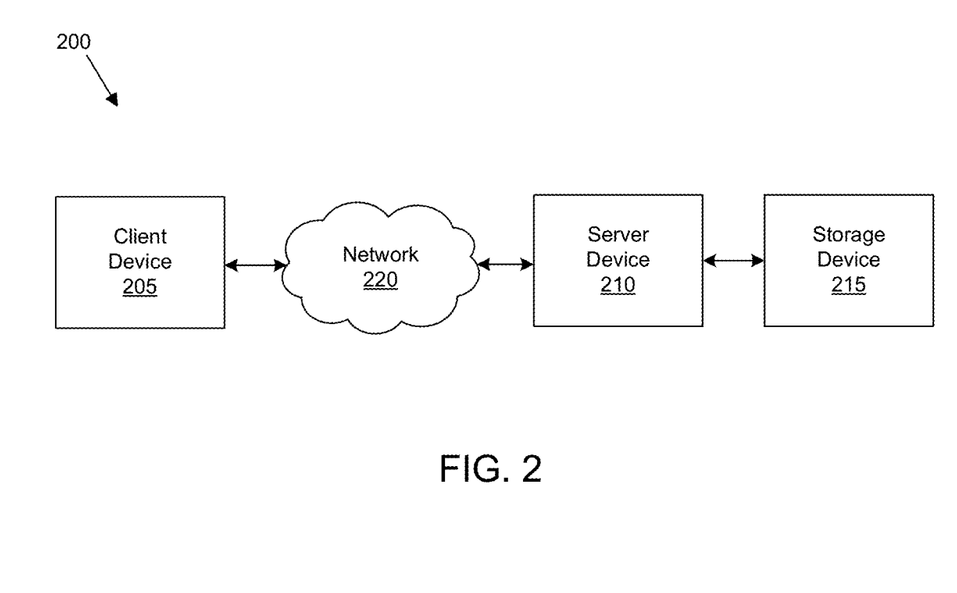
FIG. 2 shows an example networked computing environment.

Referring now to FIG. 2, an example networked computing environment 200 is shown in which aspects of the present disclosure may be implemented, including the example method 100 of FIG. 1. The environment 200 includes a client device 205, a server device 210, a storage device 215, and a network 220. Other embodiments are possible. For example, the environment 200 may generally include more or fewer devices, networks, and other components as desired.

The client device 205 and the server device 210 are computing devices, as described in further detail below in connection with FIG. 3. In example embodiments, the client device 205 is configured for selectively applying a sketch effect to one or more objects within an electronic document, and the server device 210 is configured as a business server that implements business processes that are accessible to the client device 205. Other embodiments are possible.

For example, in some embodiments, the server device 210 includes of a plurality of interconnected, networked server devices operating together in a "Farm" configuration to implement business processes. In this example, the network can provide a cloud computing platform in which one or more applications and data are hosted for one or more clients connected to the cloud computing platform. In such a scenario, functionality of the client device 205 associated with selectively applying a sketch effect to one or more objects within an electronic document may be partially or wholly implemented by the server device 210. Still other embodiments are possible.

The storage device 215 is an electronic data storage device, such as a relational database or any other type of persistent data storage device. The storage device 215 stores data in a predefined format such that the server device 210 can query, modify, and manage electronic data stored thereon. Example electronic data includes information related to directory services, authentication services, administration services, and other services such as managed by the ACTIVE DIRECTORY® directory service from Microsoft Corporation. Other embodiments are possible.

The network 220 is a bi-directional data communication path for data transfer between one or more computing devices. In the example shown, the network 220 establishes a communication path for data transfer between the client device 205 and the server device 210. The network 220 can be of any of a number of wireless or hardwired WAN, LAN, Internet, or other packet-based communication networks such that data can be transferred among the elements of the example environment 200. Other embodiments are possible.

Figure 3:
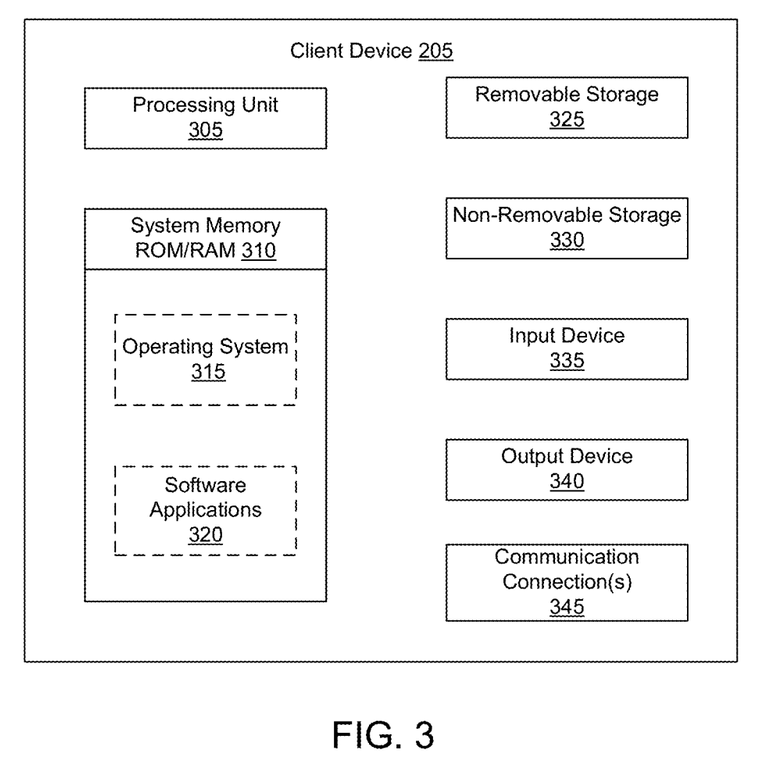
FIG. 3 shows an example computing device of the environment of FIG. 2.

Referring now to FIG. 3, the client device 205 of FIG. 2 is shown in detail. As mentioned above, the client device 205 is a computing device. An example computing device includes a desktop computer, laptop computer, personal data assistant, smartphone, gaming console, and others.

The client device 205 includes at least one processing unit 305 and a system memory 310. The system memory 310 stores an operating system 315 for controlling the operation of the server device 210 or another computing device. One example operating system is the WINDOWS® operating system from Microsoft Corporation. However, other embodiments are possible.

The system memory 310 includes one or more software applications 320 and may include program data. Software applications 320 may include many different types of single and multiple-functionality programs, such as a commercial diagramming program, server program, an electronic mail program, a calendaring program, an Internet browsing program, a spreadsheet program, a program to track and report information, a word processing program, and many others.

One example program is the OFFICE suite of business applications from Microsoft Corporation. The OFFICE suite of business applications includes a plurality of interrelated desktop applications including the Microsoft WORD application, the Microsoft EXCEL application, the Microsoft POWERPOINT application, the Microsoft VISIO application, and others. As briefly mentioned above, the Microsoft VISIO application is an example of a diagramming program.

Another example program is a server program that implements business processes. Example business processes include messaging process, collaboration processes, data management processes, and others. Exchange server from Microsoft Corporation of Redmond, Wash. is an example of a business server that implements messaging and collaborative business processes in support of electronic mail, calendaring, and contacts and tasks features, in support of mobile and web-based access to information, and in support of data storage. SHAREPOINT® collaboration server, also from Microsoft Corporation, is an example of a business server that implements business processes in support of collaboration, file sharing and web publishing.

The system memory 310 is computer-readable media. Examples of computer-readable media include computer-readable storage media and communication media. Computer-readable storage media is physical media that is distinguished from communication media.

The phrase "computer-readable" generally refers to information that can be interpreted and acted on by a computer or computing device. The phrase "storage media" or "storage medium" refers to the various types of physical or tangible material on which data bits are written and stored. Since it is not possible to store information in a transient signal, "computer-readable storage media" as defined within the context of the present disclosure excludes transient signals.

Computer-readable storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the client device 205. Any such computer storage media may be part of or external to the client device 205. Such storage is illustrated in FIG. 3 by removable storage 325 and non-removable storage 330.

Communication media is typically embodied by computer-readable instructions, data structures, program modules, or other data, in a transient modulated data signal, such as a carrier wave or other transport mechanism, and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, RF, infrared and other wireless media.

The client device 205 also includes any number and type of an input device 335 and output device 340. An example input device 335 includes a keyboard, mouse, pen, voice input device, touch input device, motion input device, and others. For example, the input device 335 may be a camera that may be operative to record a user and capture motions and/or gestures made by a user. The input device 335 may be further operative to capture words spoken by a user, such as by a microphone, and/or capture other inputs from user such as by a keyboard and/or mouse.

Consistent with embodiments of the present disclosure, the input device 335 may comprise any motion detection device capable of detecting the movement of a user. For example, the input device 335 may comprise a Kinect® motion capture device, from Microsoft Corporation, comprising a plurality of cameras and a plurality of microphones. Other embodiments are possible.

An example output device 340 includes a display, speakers, printer, and others. The server device 210 also includes a communication connection 345 configured to enable communications with other computing devices over a network (e.g., network 220 of FIG. 2) in a distributed computing system environment.

The server device 210 of FIG. 2 is also a computing device and is configured in a manner similar to that of the client device 205 described above in connection with FIG. 3.

Figure 4:
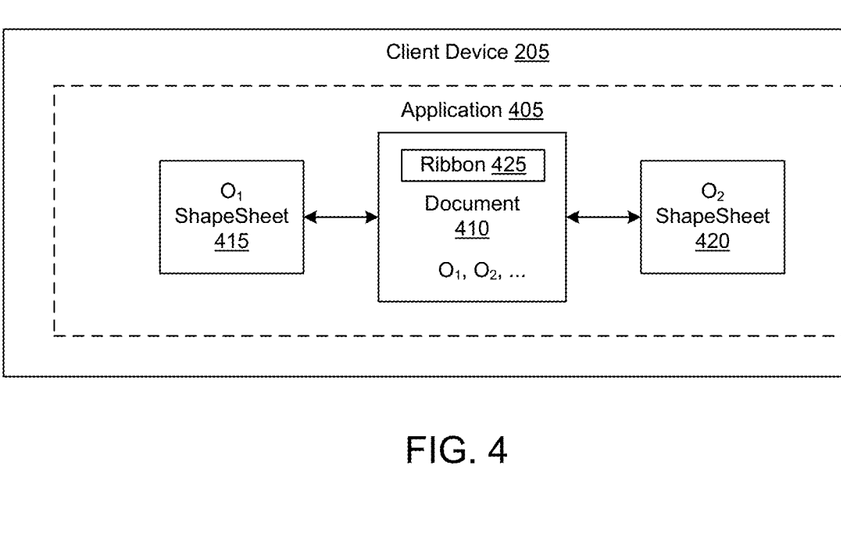
FIG. 4 shows an example application executing on a computing device configured for selectively applying a sketch effect to one or more objects within an electronic document.

Referring now to FIG. 4, the client device 205 of FIGS. 2-3 is shown. An application 405 including logical modules of software is executed on the client device 205. However, other embodiments are possible. For example, in some embodiments, one or more logical modules of the application 405 are partially or wholly located on and/or implemented by the server device 210 of FIG. 2, and are accessible to the client device 205 over a network (e.g., network 220).

The application 405 is a program configured to enable a user to create, modify, and/or interact with a document 410. The Office OFFICE suite of business applications from Microsoft Corporation is one example of such a program. In this example, the document 410 can be any one of a diagramming document, a word processing document, a spreadsheet document, a presentation document, etc. However, a type of the document 410 is only limited by a type of the application 405.

The document 410 as shown includes a plurality of objects $O_1, O_2 \ldots$. An example object $O_1$ includes a basic geometric shape, such as a rectangle, square, ellipse, circle, triangle, arrow, and others. An example object $O_2$ includes a basic flowchart shape, such as a process step shape (e.g., box shape), a terminator step shape (e.g., oval shape), a decision step shape (e.g., diamond shape), and others. Other embodiments are possible. For example, the plurality of objects $O_1$, $O_2 \ldots$ can generally be any type of perceivable element or item contained within or associated with the document 410. In the example of a diagram, the plurality of objects $O_1$, $O_2 \ldots$ can be any item used in any type of diagram (e.g., graph, chart, etc.) for the representation of information according to some visualization technique. Still other embodiments are possible.

Each of the plurality of objects $O_1, O_2 \ldots$ within the document 410 has at least one associated "ShapeSheet." A ShapeSheet is an electronic document, such as a record or spreadsheet document for example, storing information that identifies a particular associated object and determines the particular object's appearance and behavior, such as its height, width, angle, color, as well as many other object characteristics. In this example, the record or spreadsheet document includes rows, columns, and a plurality of cells at least configured to receive and manipulate alphanumeric text, numeric values, and formulas. Other embodiments are possible.

In the example of FIG. 4, a first sheet 415 tied to the document 410 stores information that identifies the object $O_1$ (e.g., object ID="x") and that drives the properties of the object $O_1$ (e.g., color, formatting, effect parameters, etc.)

within the document 410. Additionally, a second sheet 420 tied to the document 410 stores information that identifies the object $O_2$ and that drives the properties of the object $O_2$ within the document 410. The first sheet 415 and the second sheet 420 can further include information or parameters that define a "sketch effect" that, when applied to the associated object $O_1$ and $O_2$, enable the rendering of the same with a sketched or hand-drawn look or feel, as described in further detail below.

Functionality of a "sketch effect" theme associated with one or more of the plurality of objects $O_1, O_2 \ldots$, may be invoked via user interaction with a ribbon 425 within the document 410. For example, referring now additionally to FIG. 5, an example implementation of the ribbon 425 is shown. The ribbon 425 includes a plurality of tabs 505. In the example shown, a design tab 510 has been selected. In this example, the design tab 510 includes a themes group 515 and a styles group 520 partitioned by a separator 525. When a different tab of the plurality of tabs 505 is selected, such as a developer tab 530 for example, a different set of groups and/or separators are rendered. Other embodiments are possible. For example, the design tab 510 can generally include more or fewer groups and/or separators as desired.

The themes group 515 includes a default theme 535, a basic theme 540, and a sketch effect theme 545. A plurality of other themes (identified by the characters "..." in FIG. 5) within the themes group 515 are accessible by manipulation of a first scroll bar 550, such as for example by manipulation with a cursor 555. Other embodiments are possible.

Figure 5:
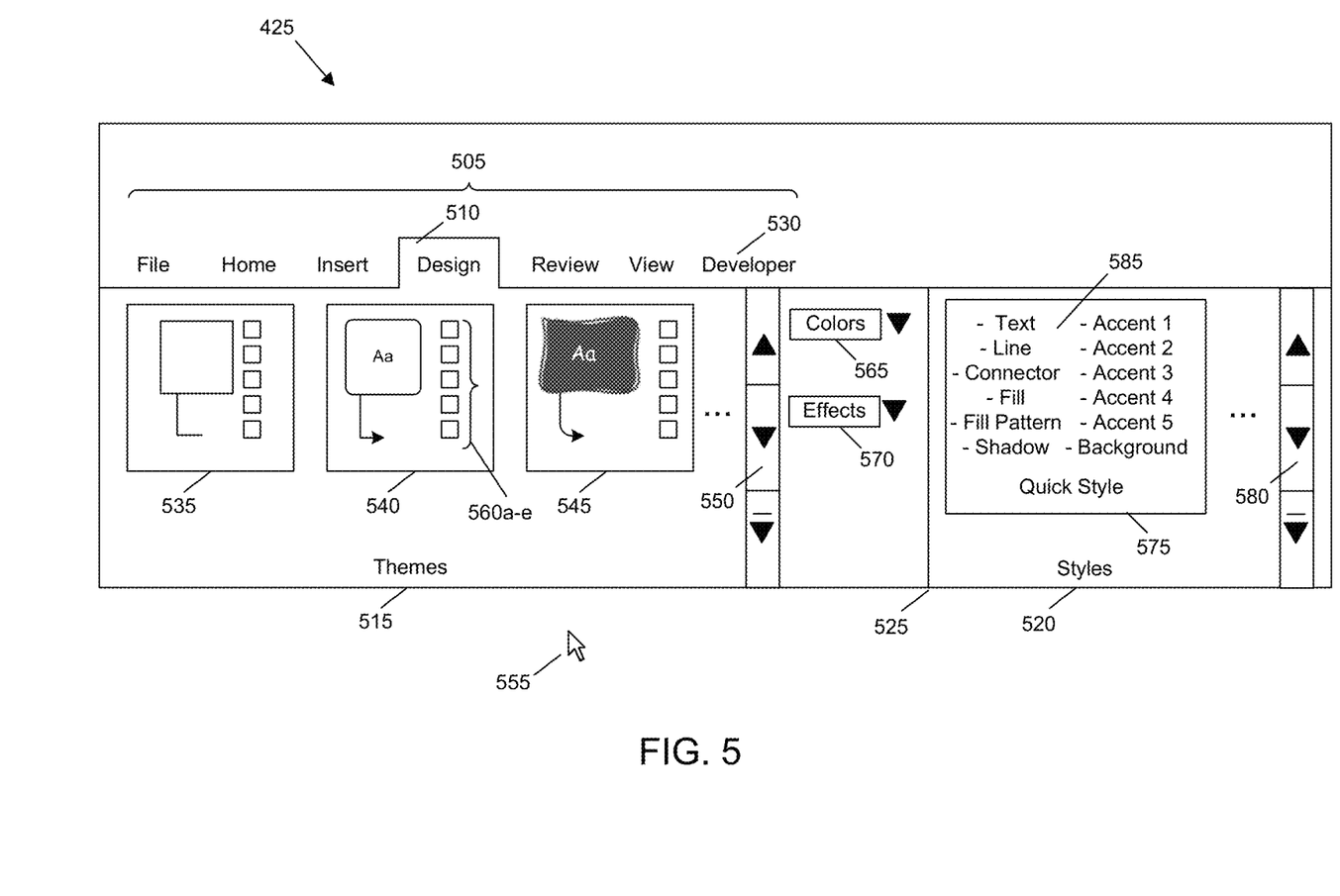
FIG. 5 shows an example ribbon interface exposed to a user by the example application of FIG. 4.

When selected, a particular theme within the themes group 515 applies at least a set of coloring, formatting, and effects to one or more objects (e.g., object $O_1$, object $O_2$) within the document 410. For example, the default theme 535 is a "no-theme" theme that when selected or previewed (e.g., via hovering cursor over the default theme 535 and optionally "clicking" a mouse) removes any existing previously added coloring, formatting, and effects from one or more objects within the document 410. In contrast, the basic theme 540 is a theme that when selected or previewed applies simple and understated, coloring, formatting, and effects to one or more objects within the document 410.

For example, when the basic theme 540 is applied to a geometric shape within the document 410, one or more characteristics are applied or modified, such as for example text type or style characteristics, line type or style characteristics, connector type or style characteristics, fill type or style characteristics, fill pattern type or style characteristics, shadow type or style characteristics, accent (identified by elements 560a-e in FIG. 5) type or style characteristics, and background type or style characteristics. These example characteristics are applied or modified in accordance with corresponding parameters as defined by the basic theme 540. Examples parameters that influence the type or style of the various characteristic elements include font, font size, weighting, coloring, patterning, and many others. Other embodiments are possible.

Following selection and application of the basic theme 540 to a geometric shape within the document 410, a ShapeSheet (e.g., first sheet 415) associated with the same is updated and saved accordingly. In this manner, the basic theme 540 applied to the geometric shape is persisted throughout different sessions in which the document 410 is open and/or in use. Additionally, the one or more of the coloring, formatting, and effects characteristics of the geometric shape may be selectively adjusted as desired. For example, such characteristics may be selectively modified by manipulation or interaction with (e.g., via cursor 555) a colors selection 565 and/or an effects selection 570 within the ribbon 425. Other embodiments are possible.

In example embodiments, application or selection of the sketch effect theme 545 operates on one or more objects (e.g., object $O_1$, object $O_2$) within the document 410 in a manner similar to that of the basic theme 540. However, the sketch effect theme 545 is theme whose colors, format, and effects are designed specifically to apply a sketched or hand-drawn look or feel to any particular object within a document 410.

Figure 6:
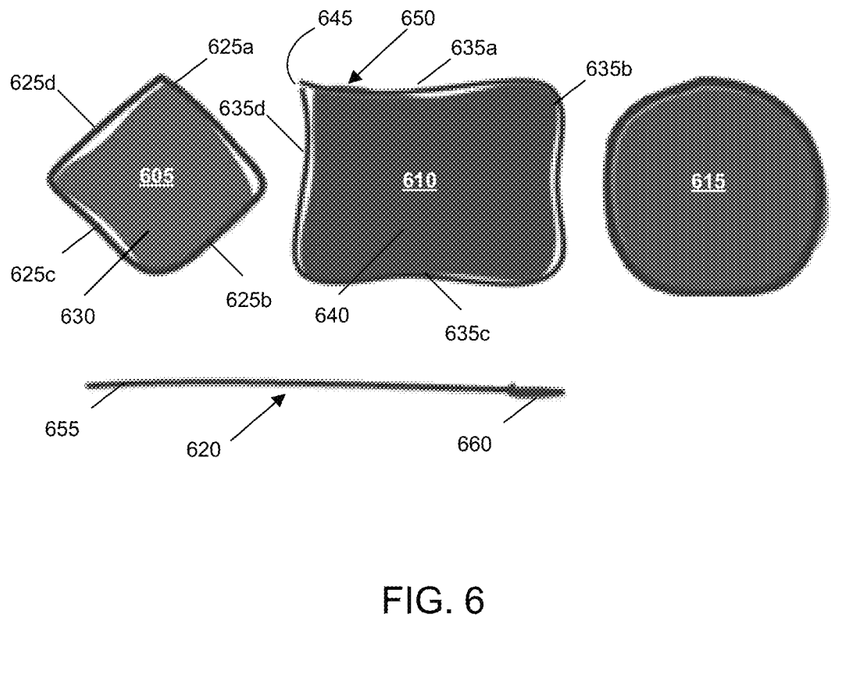
FIG. 6 shows a plurality of shapes having a sketch effect applied thereto.

For example, referring now additionally to FIG. 6, a plurality of objects are shown having one or more coloring, formatting, and effects characteristics modified such as to convey a sketched or hand-drawn look or feel. Specifically, FIG. 6 shows a first shape 605, a second shape 610, a third shape 615, and a line 620. In example embodiments, the first shape 605 corresponds to a decision step shape that may, for example, be incorporated within a flowchart in the document 410. However, the first shape 605 displays non-idealized form or formatting. For example, the first shape 605 includes sides 625a-d having slightly curved non-idealized lines with slightly varying thickness indicative of being hand-drawn with a writing implement (e.g., a pencil, pen, marker, chalk, etc.). Additionally, the first shape 605 includes a fill 630 that only partially fills, covers, or occupies an entire internal area defined within or by the sides 625a-d. In general, any type of coloring and/or formatting of the first shape 605 may be distorted to a certain, optionally varying, degree such that the same appears to being hand-drawn.

The second shape 610 and third shape 615 too include non-idealized form or formatting features conveying a feeling that the same are hand-drawn. For example, the second shape 610 includes sides 635a-d having slightly curved non-idealized lines, and a fill 640 that does not occupy an entire internal area defined within the sides 635a-d. In this example, the second shape 610 further includes a detached corner 645, and a portion 650 of fill 640 overlaps with side 635a such that the portion 650 is not fully enclosed within the internal area defined within the sides 635a-d. Such non-idealized features further enhance the feeling of a hand-drawn shape or object.

The example line 620 too includes non-idealized form or formatting features conveying a sense that the line 620 is hand-drawn. For example, a tail 655 of the line 625 is slightly curved and includes a slightly varying or variable thickness indicative of being hand-drawn. Additionally, an arrowhead 660 of the line 625 is misshapen and does not have a distinct geometric shape (e.g., triangle, etc.).

The plurality of objects of FIGS. 4 and 6 are modified to include the sketched or hand-drawn look or feel upon selection of a sketch effect theme (e.g., sketch effect theme 545 of FIG. 5) by a user. In general, the respective objects are modified to display a hand-drawn look from existing objects as defined within an associated ShapeSheet.

Figure 7:
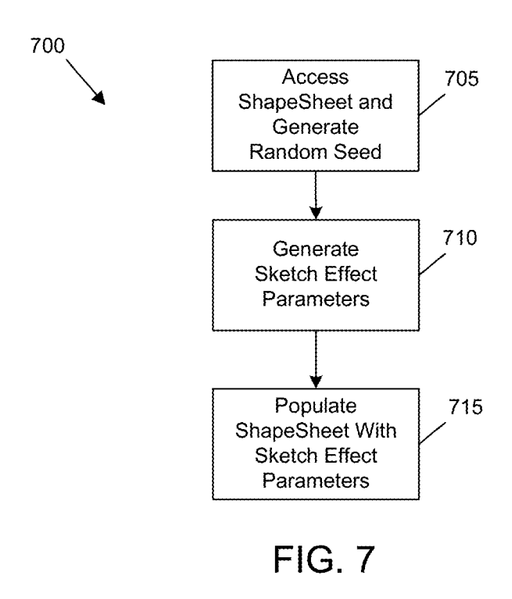
FIG. 7 shows a flowchart of an example method for generating a sketch effect to be applied to an object within a document.

For example, referring now to FIG. 7, an example method 700 for generating a sketch effect to be applied to an object within the document 410 is shown. In this example, the method 700 is at least partially implemented by the application 405 executing on the client device 205 described above in connection with FIGS. 2-6. Other embodiments are possible.

The method 700 begins at a first operation 705, at which a ShapeSheet (e.g., first sheet 415) for a particular object (e.g., object O1) is accessed by the application 405, and a random seed or number is generated by the application 405. In one embodiment, the random seed or number is an integer value. Other embodiments are possible.

Next, at a second operation 710, a plurality of parameters is generated by the application 405 using the random seed created at the first operation 705. Example parameters include:

A "Number of New Control Points" parameter. This example parameter corresponds to a number of additional control points, spread out uniformly, across a section. In general, lines and geometries may become wavier, depending on amplitude perturbations, with an increasing number of control points. Other embodiments are possible.

A "Line Weight Increment" parameter. This example parameter corresponds to a point increase in line weight. In general, lines and outlines become thicker at higher increments. Other embodiments are possible.

A "Line Start/End Increment" parameter. This example parameter corresponds to an increase in line start/end size enumeration(s). In general, line start/end sizes become larger at higher increments. Other embodiments are possible.

A "Line Amplitude Perturbation" parameter. This example parameter corresponds to an amount of perturbation, in percentage vs. length of a section, of a line control point (inclusive of lines and shape outlines). In general, lines and outlines become more random with higher amplitude. Other embodiments are possible.

A "Fill Amplitude Perturbation" parameter. This example parameter corresponds to an amount of perturbation, in percentage vs. length of a section, of a fill control point. Fill geometries become more random with higher amplitude. Other embodiments are possible.

A "Min Number of Curves Represented by Non-Uniform, Rational, B-spline (NURB)" parameter. This example parameter corresponds to a minimum number of sections that a single NURB can represent. In general, the greater the number of sections that a single NURB can represent, the fewer detached corners and line end artifacts there are. For example, a high number of sections can be thought of as drawing a shape on paper with a smooth stroke and minimal lifting of the pen, while a low number of sections can be thought of as drawing a shape with frequent pen lifting. Other embodiments are possible.

A "Max Number of Curves Represented by NURB" parameter. This example parameter corresponds to a maximum number of sections that a single NURB can represent. Other embodiments are possible.

Still other example sketch effect parameters are possible as well.

Next, at a third operation 715, the application 405 populates the ShapeSheet accessed at the first operation 705 to persist all sketch effect parameter values. Example entries within the ShapeSheet are shown in the below example Table 1:

| Cell Name | Description | Value | Default Value |
|---|---|---|---|
| SketchEnabled | Determines whether Sketch Effect is enabled or not on a shape. | Boolean | FALSE |
| SketchAmount | Determines number of control points. | (0-25, integer) | 5 |
| SketchLineWeight | A constant line weight increase added to each line segment. | (0-50 point) | 3 point |
| SketchLineChange | Determines line amplitude perturbation. | (0-100%) | 14% |
| SketchFillChange | Determines fill amplitude perturbation. | (0-100%) | 10% |
| SketchSeed | The random Sketch Effect seed assigned to a shape. Persisting the random seed will allow to reconstruct the precise Sketch Effect that a user last viewed. | Random positive integer | 0 |

Other entries within example Table 1 are possible as well.

Following operation 715, the ShapeSheet associated with the particular object stores a plurality of sketch effect parameters. Subsequently, the application 405 accesses the ShapeSheet to render the object within the document 410 information at run-time, the particular object's appearance and behavior are modified to display a hand-drawn look or feel (e.g., first shape 605) in accordance with those parameters defined within the ShapeSheet. Other embodiments are possible.

Figure 8:
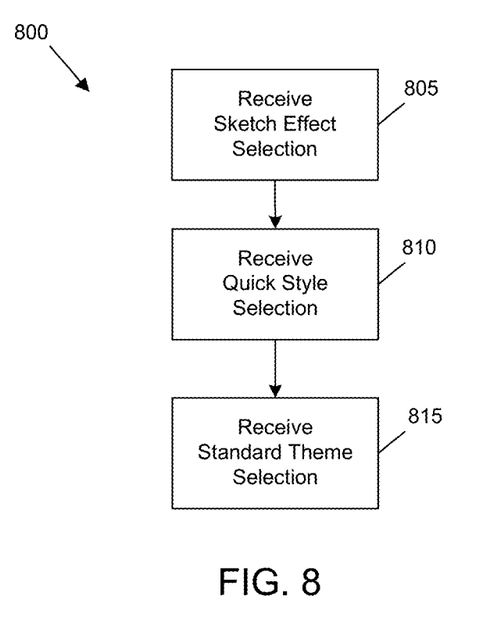
FIG. 8 shows a flowchart of an example method for applying and removing a sketch effect to at least one object within a document.

Referring now to FIG. 8, an example method 800 for applying and removing a sketch effect to at least one object within the document 410 is shown. In this example, the method 800 is at least partially implemented by the application 405 executing on the client device 205 described above in connection with FIGS. 2-6. Other embodiments are possible.

The method 800 begins at an operation 805, at which a sketch effect selection is received by the application 405. In one embodiment, and referring now additionally to FIG. 5, a user hovers over (e.g., via cursor 555) the sketch effect theme 545 in the themes group 515. To live preview the selection, the application 405 generates a randomized seed to the at least one object as long as the at least one object does not already include a random seed in an associated "SketchSeed" cell (see e.g., Table 1 above). When the user commits the selection (e.g., selection via cursor 555), the application 405 writes out the generated randomized seed to the SketchSeed cell of the at least one object to the associated ShapeSheet. The application 405 also automatically updates the at least one object's new sketch effect parameters, and sets an associated "SketchEnabled" parameter (see e.g., Table 1 above) to TRUE. Other embodiments are possible.

Returning now to FIG. 8, a sketch effect is applied to the at least one object within the document 410 following operation 805 because the user has committed the selection.

Next, at an operation 810, a quick style selection is received by the application 405. In one embodiment, and referring now again to FIG. 4, a user selects the at least one object within the document 410 and views a "Quick Style" in the styles group 520, shown in the ribbon 425 in FIG. 5. In the example of FIG. 5, a Quick Style 575 is shown. A plurality of other Quick Styles (identified by the characters "..." in FIG. 5) within the styles group 520 are accessible by manipulation of a second scroll bar 580, such as for example by manipulation with the cursor 555. Other embodiments are possible.

In general, a Quick Style is a saved set of formatting options. For example, a user may have particular text that is frequently used for major headings, minor headings, and sub-headings, etc. A Quick Style allows the user to save this formatting and apply it ad infinitum. In the example of FIG. 5, the Quick Style 575 includes a plurality of formatting entries 585 including a text format entry, a line format entry, a connector format entry, a fill format entry, a fill pattern format entry, a shadow format entry, an $accent_{1-5}$ format entry, and a background format entry. Other embodiments are possible.

The application 405 generates a new SketchSeed for the at least one object when the user hovers over (e.g., via cursor 555) the Quick Style 575 in the styles group 520 to live preview the Quick Style 575 on the at least one object. When the user commits the selection, the at least one object immediately begins taking after both the formatting inherited from the Quick Style 575, as well as the new sketched look specified by the generated SketchSeed, and sketch effect parameters within the associated ShapeSheet and the SketchSeed. Other embodiments are possible.

Returning now to FIG. 8, a new sketch effect Quick Style is applied to the at least one object within the document 410 following operation 810 because the user has committed the selection.

Next, at an operation 815, a standard theme selection is received by the application 405. In one embodiment, and referring now again to FIG. 4, the user selects the basic theme 540 to apply to the at least one object. The application 405 then populates the SketchEnabled parameter entry FALSE, which removes the sketch effect rendering applied to the at least one object. However, the Quick Style 575 that was set under sketch effect at operation 810 will transition back to the basic theme 540. In this manner, that at least one object that was set to Quick Style 575 under sketch effect theme 545 continues to take after the Quick Style 575 in the definition of the basic theme 540. Other embodiments are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, embodiments of the present disclosure may be practiced via a system-on-a-chip (SOC) where each or many of the components illustrated in FIG. 2 may be integrated onto a single integrated circuit. Such an SOC device may include one or more processing units, graphics units, communication units, system virtualization units and application functionality, all of which are integrated onto a chip substrate as a single integrated circuit.

Additionally, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, at a diagramming application executing on a computing device, a request to preview a sketch effect theme comprising a set of characteristics to be applied to an object that comprises a geometric shape within a document, wherein the set of characteristics are selected from the group comprising: text characteristics; line characteristics; connector characteristics; fill characteristics; shadow characteristics; accent characteristics; and background characteristics wherein the sketch effect theme defines sketch effects applied to the object to display a sketched display appearance;

accessing a shape sheet associated with the object and generating a random sketch effect seed in response to receiving the request to preview the sketch effect theme;

generating a plurality of sketch effect parameters based on the random sketch effect seed, wherein the plurality of sketch effect parameters at least partially distort at least one feature of the object to generate a modified object that includes at least one of: a curved line; a line having a varying thickness along a length of the line; a fill that incompletely occupies an internal area defined by a plurality of sides of the object; a fill that overlaps at least one side of a plurality of sides of the object; and a discontinuity along a length of a line, wherein the modified object is to be displayed with the sketched display appearance;

populating the shape sheet with the plurality of sketch effect parameters including populating the shape sheet with a value for a number of control points based on the random sketch effect seed, a value for a line amplitude perturbation based on the random sketch effect seed, and a value for a fill amplitude perturbation based on the random sketch effect seed;

storing the random sketch effect seed and the plurality of sketch effect parameters in a record associated with the document, the record comprising a plurality of cells at least configured to receive and manipulate alphanumeric text, numeric values, and formulas; and at least temporarily rendering the modified object with the sketched display appearance in the diagramming application on a display of the computing device.

2. The method of claim 1, further comprising modifying at least one characteristic of the set of characteristics in response to receiving a request to modify the at least one characteristic.

3. The method of claim 1, further comprising:
closing the document in response to receiving a request to exit the document;
retrieving the random sketch effect seed and the plurality of sketch effect parameters from the record in response to receiving a request to open the document; and
at least temporarily rendering the modified object in the diagramming application on the display of the computing device.

4. The method of claim 1, wherein the object is a geometric shape.

5. The method of claim 1, wherein the random sketch effect seed is an integer value.

6. The method of claim 1, further comprising:
applying a second set of formatting characteristics to the modified object in response to receiving a request to apply the second set of formatting characteristics; and
maintaining distortion of the at least one feature.

7. The method of claim 6, further comprising:
applying a second theme comprising a third set of characteristics to the modified object within the document in response to receiving a request to apply the second theme; and
removing distortion of the at least one feature.

8. The method of claim 1, wherein the object is one of: an image; a clip art item; a chart; and an equation.

9. A system configured to:
receive, at a diagramming application executing on a computing device, a request to preview a sketch effect theme comprising a set of characteristics to be applied to an object that comprises a geometric shape within a document, wherein the set of characteristics are selected from the group comprising: text characteristics; line characteristics; connector characteristics; fill characteristics; shadow characteristics; accent characteristics; and background characteristics wherein the sketch effect theme defines sketch effects applied to the object to display a sketched display appearance;

access a shape sheet associated with the object and generate a random sketch effect seed in response to receiving the request to preview the sketch effect theme;

generate a plurality of sketch effect parameters based on the random sketch effect seed, wherein the plurality of sketch effect parameters at least partially distort at least one feature of the object to generate a modified object that includes at least one of: a curved line; a line having a varying thickness along a length of the line; a fill that incompletely occupies an internal area defined by a plurality of sides of the object; a fill that overlaps at least one side of a plurality of sides of the object; and a discontinuity along a length of a line, wherein the modified object is to be displayed with the sketched display appearance;

populate the shape sheet with the plurality of sketch effect parameters that including populating the shape sheet with a value for a number of control points based on the random sketch effect seed, a value for a line amplitude perturbation based on the random sketch effect seed, and a value for a fill amplitude perturbation based on the random sketch effect seed;

store the random sketch effect seed and the plurality of sketch effect parameters in a record associated with the document, the record comprising a plurality of cells at least configured to receive and manipulate alphanumeric text, numeric values, and formulas; and render the modified object with the sketched display appearance in the diagramming application on a display of the computing device.

10. The system of claim 9, further configured to:
apply a second set of formatting characteristics to the modified object in response to receiving a request to apply the second set of formatting characteristics; and
maintain distortion of the at least one feature.

11. The system of claim 10, further configured to:
apply a second theme comprising a third set of characteristics to the modified object within the document in response to receiving a request to apply the second theme; and
remove distortion of the at least one feature.

12. The system of claim 9, further configured to:
close the document in response to receiving a request to exit the document;
retrieve the random sketch effect seed and the plurality of sketch effect parameters from the record in response to receiving a request to exit the document; and
at least temporarily render the modified object displayed with the sketched display appearance in the diagramming application on the display of the computing device.

13. The system of claim 9, wherein the object is a geometric shape.

14. The system of claim 9, wherein the object is one of: an image; a clip art item; a chart; and an equation.

15. The system of claim 9, wherein the random sketch effect seed is an integer value.

16. A computer-readable storage medium that is not a signal having computer-executable instructions that, when executed by a computing device, cause the computing device to perform steps comprising:

receiving, at a diagramming application executing on the computing device, a request to preview a sketch effect theme comprising a set of characteristics to be applied to an object that comprises a geometric shape within a document, wherein the set of characteristics are selected from the group comprising: text characteristics; line characteristics; connector characteristics; fill characteristics; shadow characteristics; accent characteristics; and background characteristics wherein the sketch effect theme defines sketch effects applied to the object to display a sketched display appearance;

accessing a shape sheet associated with the object and generating a random sketch effect seed in response to receiving the request to preview the sketch effect theme;

generating a plurality of sketch effect parameters based on the random sketch effect seed, wherein the plurality of sketch effect parameters at least partially distort at least one feature of the object to generate a modified object that includes at least one of: a curved line; a line having a varying thickness along a length of the line; a fill that incompletely occupies an internal area defined by a plurality of sides of the object; a fill that overlaps at least one side of a plurality of sides of the object; and a discontinuity along a length of a line, wherein the modified object is to be displayed with the sketched display appearance;

populating the shape sheet with the plurality of sketch effect parameters including populating the shape sheet with a value for a number of control points based on the random sketch effect seed, a value for a line amplitude perturbation based on the random sketch effect seed, and a value for a fill amplitude perturbation based on the random sketch effect seed;

storing the random sketch effect seed and the plurality of sketch effect parameters in a record associated with the document, the record comprising a plurality of cells at least configured to receive and manipulate alphanumeric text, numeric values, and formulas;

closing the document in response to receiving a request to exit the document;

retrieving the random sketch effect seed and the plurality of sketch effect parameters from the record in response to receiving a request to open the document; and at least temporarily rendering the modified object with the sketched display appearance in the diagramming application on a display of the computing device.

17. The computer-readable storage medium of claim 16, further performing steps of:
applying a second set of formatting characteristics to the modified object in response to receiving a request to apply the second set of formatting characteristics; and
maintaining distortion of the at least one feature.

18. The computer-readable storage medium of claim 17, further performing steps of:
applying a second theme comprising a third set of characteristics to the modified object within the document in response to receiving a request to apply the second theme; and
removing distortion of the at least one feature.

19. The computer-readable storage medium of claim 16, wherein the object is one of: an image; a clip art item; a chart; and an equation.

* * * * *